United States Patent
Gilbert et al.

[11] Patent Number: 6,097,804
[45] Date of Patent: Aug. 1, 2000

[54] METHOD AND SYSTEM FOR COMPLETING A VOICE CONNECTION BETWEEN FIRST AND SECOND VOICE TERMINALS IN A SWITCHED TELEPHONE NETWORK

[75] Inventors: Gordon J. Gilbert, New Market; Colin A. Reid; Gordon R. Melick, both of Ottawa; L. Lloyd Williams, Kanata, all of Canada

[73] Assignee: Bell Canada, Montreal, Canada

[21] Appl. No.: 08/996,879

[22] Filed: Dec. 23, 1997

[51] Int. Cl.[7] .............................. H04M 7/00; H04L 12/66
[52] U.S. Cl. .......................... 379/230; 370/352; 370/401; 379/900; 379/901
[58] Field of Search .................................... 379/219, 220, 379/221, 229, 230, 201, 114, 115, 112, 207, 900, 901; 370/352, 401

[56] References Cited

U.S. PATENT DOCUMENTS

| | | | |
|---|---|---|---|
| 5,282,244 | 1/1994 | Fuller et al. | 379/230 |
| 5,377,186 | 12/1994 | Wegner et al. | 379/207 |
| 5,519,770 | 5/1996 | Stein | 379/201 |
| 5,550,816 | 8/1996 | Hardwick et al. | 370/397 |
| 5,583,926 | 12/1996 | Venier et al. | 379/207 |
| 5,586,177 | 12/1996 | Farris et al. | 379/230 |
| 5,602,909 | 2/1997 | Carkner et al. | 379/207 |
| 5,610,977 | 3/1997 | Williams et al. | 379/207 |
| 5,661,782 | 8/1997 | Bartholomew et al. | 379/212 |
| 5,732,130 | 3/1998 | Iapalucci et al. | 379/207 |
| 5,768,358 | 6/1998 | Venier et al. | 379/207 |
| 5,881,132 | 3/1999 | O'Brien et al. | 379/230 |
| 5,923,659 | 7/1999 | Curry et al. | 370/401 |
| 5,930,258 | 7/1999 | Dato Solis et al. | 370/401 |

FOREIGN PATENT DOCUMENTS

| | | |
|---|---|---|
| 2-677 517 | 12/1992 | France . |
| WO 9735416 | 9/1997 | WIPO .............................. H04M 3/42 |

*Primary Examiner*—Harry S. Hong
*Attorney, Agent, or Firm*—Foley & Lardner

[57] ABSTRACT

A method and a system for completing a voice connection between a first and second voice terminal in a switched telephone network (STN) are disclosed. The system includes a Virtual Switching Point (VSP) in a switched telephone network having a connection to a data network such as the Internet. Call requests are received by the VSP from the data network and processed by the VSP to establish a voice connection between a calling party which initiates the call requests and a called party number indicated in each call request message. The call request message may include a plurality of called party numbers and the VSP completes calls to each number in sequence without terminating the voice connection with the calling party, until an attempt to connect with each of the called numbers has been made or a call control option is exercised by the calling party. The call connections are established and controlled by the VSP using common channel signaling (CCS) messages. The call connections are controlled by the calling party using data messages passed to the VSP via the data network. The advantage is an efficient, reliable method of initiating calls from a data network to permit a multi-call session without disconnection or dialing between calls and fully functional computer telephony integration and control over calling connections using the inherent switching power resident in the STN.

32 Claims, 6 Drawing Sheets

Welcome To Call Facilitator

- ☐ Registered Users Logon

- ☐ Calling Card, Credit Card or Debit Card Session

- ☐ Register as a User

- ☐ About Call Facilitator

FIG. 3

Welcome To Call Facilitator

Enter or verify the number from which you wish to place calls during this session:

[6][1][3]  [7][8][0]  [8][6][3][0] ~68

Enter the number(s) which you wish to call during this session:

70 →

| Your Personal Phone Book | ~72 |
| Corporate Directory | ~73 |

DIRECTORIES: ~74

Canada   U.S.A   Global

METHOD AND SYSTEM FOR COMPLETING A VOICE CONNECTION BETWEEN FIRST AND SECOND VOICE TERMINALS IN A SWITCHED TELEPHONE NETWORK

RELATED APPLICATIONS

This application is related to applicant's co-pending U.S. patent application Ser. No. 08-939,909 entitled METHOD AND APPARATUS FOR DYNAMICALLY ROUTING CALLS IN AN INTELLIGENT NETWORK which was filed on Sep. 29, 1997, the specification of which is incorporated herein by reference in its entirety.

TECHNICAL FIELD

This invention relates generally to the completion of voice connections in a switched telephone network, and in particular to the completion of voice connections in a switched telephone network using a data request message for initiating the voice connection.

BACKGROUND OF THE INVENTION

Many service providers in North America, and particularly in the United States, offer a long distance service generally referred to as a "call-back" service. In that service, individuals residing or traveling in foreign countries are invited to take advantage of lower long distance rates available in North America by dialing a toll free number which alerts the service provider's system that the subscriber wishes to make a long distance call using North American facilities. The subscriber system captures the caller's telephone number from the Common Channel Signaling (CCS) call setup messages. As soon as the toll free call is received, it is terminated and the system initiates a call-back. When the subscriber answers the call-back, he is provided with a dial tone or prompt indicating that he may dial a number to which he wishes to place the long distance call. The subscriber then dials the digits required to complete the call. Since the call is completed over the facilities of the service provider, the subscriber pays the lower long distance rates applicable in North America. While this system is advantageous in terms of costs, it is awkward and time consuming to use because of the plurality of digits that must be dialed in order to effect call completion.

Computer telephony integration products are also known. For example, desktop call control applications for Windows®-based Personal Computer users are available which permit graphical access and control of the user's telephone handset and voice mailbox. Such applications may also automate the handling of inbound and outbound telephone calls. A shortcoming of such applications is that they do not leverage the switching power resident in the Switched Telephone Network (STN). Instead, they try to duplicate that switching power and thereby sacrifice efficiency.

It is likewise known to use a multimedia PC to complete Voice Over Internet Protocol (VoIP) calls using the Internet as a transport medium. Gateways have even been established in certain cities which permit VoIP calls to be completed to a regular telephone on the Switched Telephone Network (STN). The gateways convert VoIP packets to STN voice format, and vice/versa, after a dial-up connection is established with the regular telephone. While VoIP appears to be an attractive alternative to STN voice connections, it suffers from several disadvantages. Obviously, it extensively uses computer resources and access to the data network so that they are less available for other functions. Due to the current demand for bandwidth on the Internet, VoIP transmission quality is also frequently poor. Besides, multimedia PCs still represent only a small portion of the total PC devices in use, and a service directed to those PC users without multimedia PCs is beneficial.

There therefore exists a need for a method and apparatus which combine the enhanced functionality of computerized call control with the dependability and assured transmission quality of STN facilities and uses the inherent switching power resident in the STN.

SUMMARY OF THE INVENTION

It is an object of the invention to provide a method of completing a voice connection between a first and second voice terminal on a Switched Telephone Network using call requests originating from a data network.

It is a further object of the invention to provide a method of completing a voice connection between a first and second voice terminal on a Switched Telephone Network using signaling messages originating in a signaling node of the STN.

It is yet a further object of the invention to provide a method of completing a voice connection between a first and second voice terminal in an STN wherein the connection with the first voice terminal is maintained until a plurality of sequential connections with other voice terminals are respectively completed.

It is another object of the invention to provide a system for completing a voice connection between first and second voice terminals connected to an STN in which a Virtual Switching Point (VSP) which is a physical node in the signaling network and a virtual node in the transmission network of the STN is provided with a signaling link with a data network for receiving call requests via the data network from a user of the first voice terminal.

It is yet a further object of the invention to provide a system for completing a voice connection between first and second terminals connected to an STN wherein the system includes a public server which accepts call requests and forwards the call requests to a VSP in a local calling area of the requesting user.

The invention therefore provides a method of completing a voice connection between a first and second voice terminal on a Switched Telephone Network (STN), comprising the steps of:

receiving a call request at a Virtual Switching Point (VSP) in the STN having a connection to a data network;

sending a first Common Channel Signaling (CCS) message from the VSP over a signaling network of the STN to an SP in the STN to initiate a first leg of the voice connection; and sending a second CCS message from the VSP to an SP in the STN to initiate a second leg of the voice connection;

the first and second CCS messages being interrelated to an extent that a circuit identification code in each message is associated with opposite ends of the same facility.

In accordance with the invention, there is further provided a system for completing a voice connection between first and second voice terminals connected to a switched telephone network (STN), comprising:

a virtual switching point (VSP) which is a physical node in the signaling network and a virtual node in the transmission network of the STN, the VSP including:

a data link with a data network for receiving call requests via the data network from a calling party having a first voice terminal, the call request including a telephone number for the first voice terminal and a telephone number for at least the second voice terminal;

means for generating a first common channel signaling (CCS) message sequence to initiate a voice connection with the first voice terminal and a second CCS message sequence to initiate a voice connection with the second voice terminal, the first and second CCS message sequences being related to an extent that a circuit identification code of each CCS message is respectively associated with opposite ends of the same voice facility.

The invention therefore provides a method and a system for completing voice connections between voice terminals in an STN using the flexibility of computer control exercised through the data network independently of either voice terminal. The method and the system provide several advantages over prior art methods of completing voice connections. First, it provides all of the advantages and flexibility of computer control, including automated dialing from electronic telephone books or directories. It also provides the advantage of sequential calling without disconnection of the calling party so that a plurality of sequential calls may be completed without interrupting the user's voice connection with an originating Switching Point (SP) in the STN.

The system in accordance with the invention includes a Virtual Switching Point (VSP) which is a physical node in the signaling network of the STN and a virtual node in the transmission network of the STN. The VSP is enabled to receive call request messages from a data network such as a local area network (LAN), a Wide Area Network (WAN), an Intranet or the Internet. The VSP processes the call request which may include more than one called number. An initial call request is processed by sending a common channel signaling message from the VSP to an SP in a local calling area of the calling party to initiate a voice connection with a first voice terminal. After the connection is established with the first voice terminal, a second common channel signaling message is sent to a switching point in the STN to initiate a connection with the second voice terminal. The voice connections may be local or long distance voice connections.

Users of the system are either subscribers or casual users. Casual users must provide a calling card, credit card or debit card number in order to gain access to the functionality of the system so that any long distance calls placed may be properly billed.

In accordance with a second embodiment of the invention, users of a Private Branch Exchange (PBX) may control outgoing call connections from a data terminal connected to a VSP which is a physical node in ISDN signaling links between the PBX and an SP/SSP to which an ISDN trunk group for the PBX is connected. This arrangement permits ultimate flexibility in outbound call control and can be used to significantly enhance the outbound dialing features of the PBX, including sequential call completion without disconnection of the originating line.

Since the method and the system in accordance with the invention utilize the inherent switching capabilities of the STN and the functionality resident in the common channel signaling network which controls the STN, a system in accordance with the invention can be quickly developed and deployed to offer enhanced functionality to subscribers. Unlike prior art systems, transmission quality is assured, protocol compatibility problems are avoided, and voice circuits are efficiently used. The invention therefore provides a method which capitalizes on the inherent functionality of the STN without waste or duplication of voice circuits and without relying on the feature functionality of specific switching nodes.

BRIEF DESCRIPTION OF THE DRAWINGS

The invention will now be further explained by way of example only and with reference to the following drawings, wherein.

DETAILED DESCRIPTION OF THE PREFERRED EMBODIMENT

The invention relates to a method and a system for completing a voice connection between a first and second voice terminal in a switched telephone network (STN).

Figure 1:
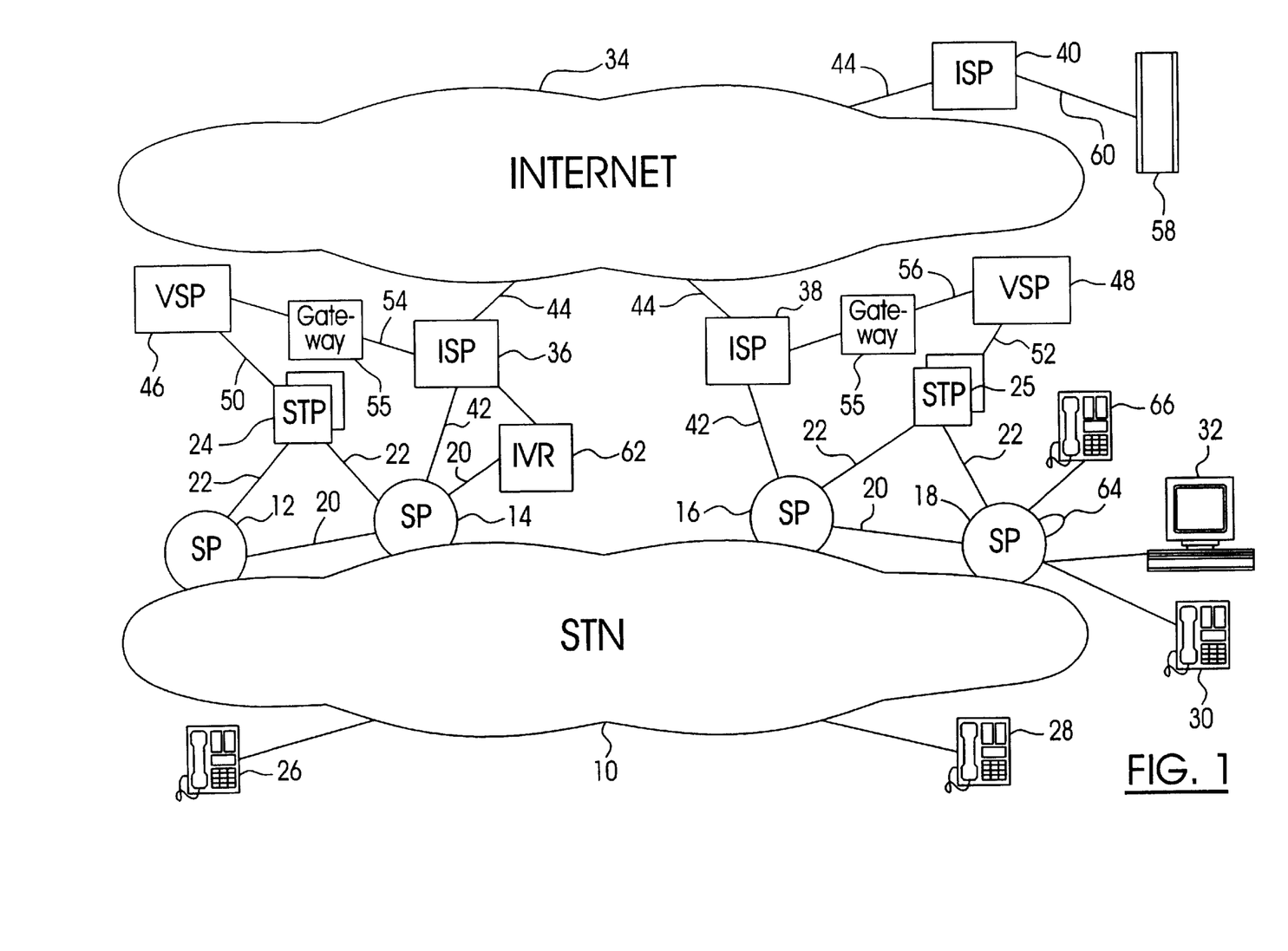
FIG. 1 is a schematic diagram of a switched telephone network equipped with a system in accordance with the invention for completing voice connections between first and second voice terminals.

FIG. 1 is a schematic diagram of an STN 10 equipped with a system for practicing methods in accordance with the invention. The STN 10 includes a plurality of switching nodes generally referred to as Switching Points (SP) 12,14, 16 and 18 as well as a plurality of other SPs which are not illustrated. The SPs 12–18 are connected to the STN and to each other by trunk groups 20 which are facilities for transporting voice, fax or data. The STN includes a signaling network and a transmission network. The trunk groups 20 are part of the transmission network. A plurality of signaling links make up the signaling network of the STN. Each signaling link 22 connects an SP 12–18 with a Signal Transfer Point (STP) 24,25. The STPs 24,25 are normally arranged in redundant pairs and each SP 12–18 has a signaling link 22 to each of the STPs 24,25 in the pair. Normally, the STP pairs 24,25 are also interconnected with signaling links in a manner well known in the art, although for the sake of simplicity those links are not shown in FIG. 1.

The SPs 12–18, the STP pairs 24,25 the trunks 20 and the signaling links 22 comprise the basic components of the STN 10. An STN will normally include at least one Service Control Point (SCP) which for the sake of simplicity is not illustrated as it is not directly relevant to the invention. The STN 10 serves a plurality of subscribers having voice terminals 26, 28, 30 and 66. The subscribers may also have Personal Computers (PC) 32 connected to the STN by a dial-up connection. Among other things, the PCs 32 are normally used to access the Internet 34 through an Internet Service Provider (ISP) 36,38 or 40. The ISPs 36,38 are connected to SPs 14,16 by data transmission links 42 which may be a T1 trunk with a modem attached to each end, an Integrated Systems Digital Network Basic Rate Interface (ISDN, BRI), a line appearance with a modem attached to each end, a splitter with an Asynchronous Digital Subscriber Loop (ADSL) connection, or the like. The ISPs 36,38,40 are connected to the Internet 34 by data transmission links 44 which may be any one of the data links described above, for example.

The system in accordance with the invention includes a Virtual Switching Point (VSP) 46,48. Each VSP 46,48 is a physical node in the signaling network of the STN and a virtual node in the transmission network of the STN, as will be explained below in some detail. As a physical node in the signaling network, VSP 46 is connected to the STP pair 24 by a signaling link 50 and the VSP 48 is connected to STP pair 25 by a signaling link 52. The signaling links 50,52 may be A, B or D links, as is well known in the art. The VSP 46 is also connected to the ISP 36 by a data link 54 and the VSP 48 is connected to the ISP 38 by data link 56. Internet gateways 55 are deployed on links 54,56 to protect the CCS network from unauthorized use. The data links 54,56 may comprise any data transmission link such as a line appearance with a modem on each end, and may use a transmission protocol such as the TCP/IP protocol.

The system shown in FIG. 1 further includes a public server 58 which may be a World Wide Web (WWW) server well known in the art. The public server 58 is connected to the ISP 40 by a data link 60. The system may further include an Interactive Voice Recognition Unit (IVR 62) connected to SP 14 by a trunk 20, typically a DS1 or a T1 facility. The function of the VSPs 46,48; the public server 58 and the IVR 62 will be explained below in some detail.

The system shown in FIG. 1 is intended to be used by subscribers to the STN 10 having PCs 32 with access to the Internet 34. Using the system in accordance with the invention, a subscriber with a PC 32 is able to set up call connections by accessing the public server 58. Call requests are entered at the public server 58. The public server 58 passes the call requests to a VSP located in a local calling area of the subscriber making the request. In the example which follows, the subscriber uses PC 32 to make a call request, which is forwarded by the public server 58 to the VSP 48. As will be explained below in more detail, on receipt of the call request, the VSP 48 sends a first signaling message to the SP 18 to establish a first voice connection with the subscriber telephone 30. After the SP 18 confirms a connection with the subscriber telephone 30, the VSP 48 sends a second common channel signaling message to an SP in the STN to initiate a second leg of the voice connection between the subscriber telephone 30 and a called party which may be any one of subscriber telephones 26,28 or 66. The SP which receives the second common channel signaling message depends on the structure of the network and, to a lesser extent, the location of the called party. In order to ensure that signaling messages which permit the VSP 48 to control the call connection are routed through the VSP 48, the call must be routed over facilities which are logically, though not physically, connected to the VSP 48. This may be accomplished in at least one of the two ways. For example, a loop-back trunk group 64 connected to SP 18 may be assigned link sets which are associated with the VSP 48 as if the VSP 48 were a physical switching node in the loop-back trunk group 64. Likewise, one or more members of the trunk groups 20 may be assigned to a trunk group whose link set indicates that the VSP 48 is a switching point in the trunk group, as was explained in detail in applicant's co-pending patent application referenced above.

Figure 2:
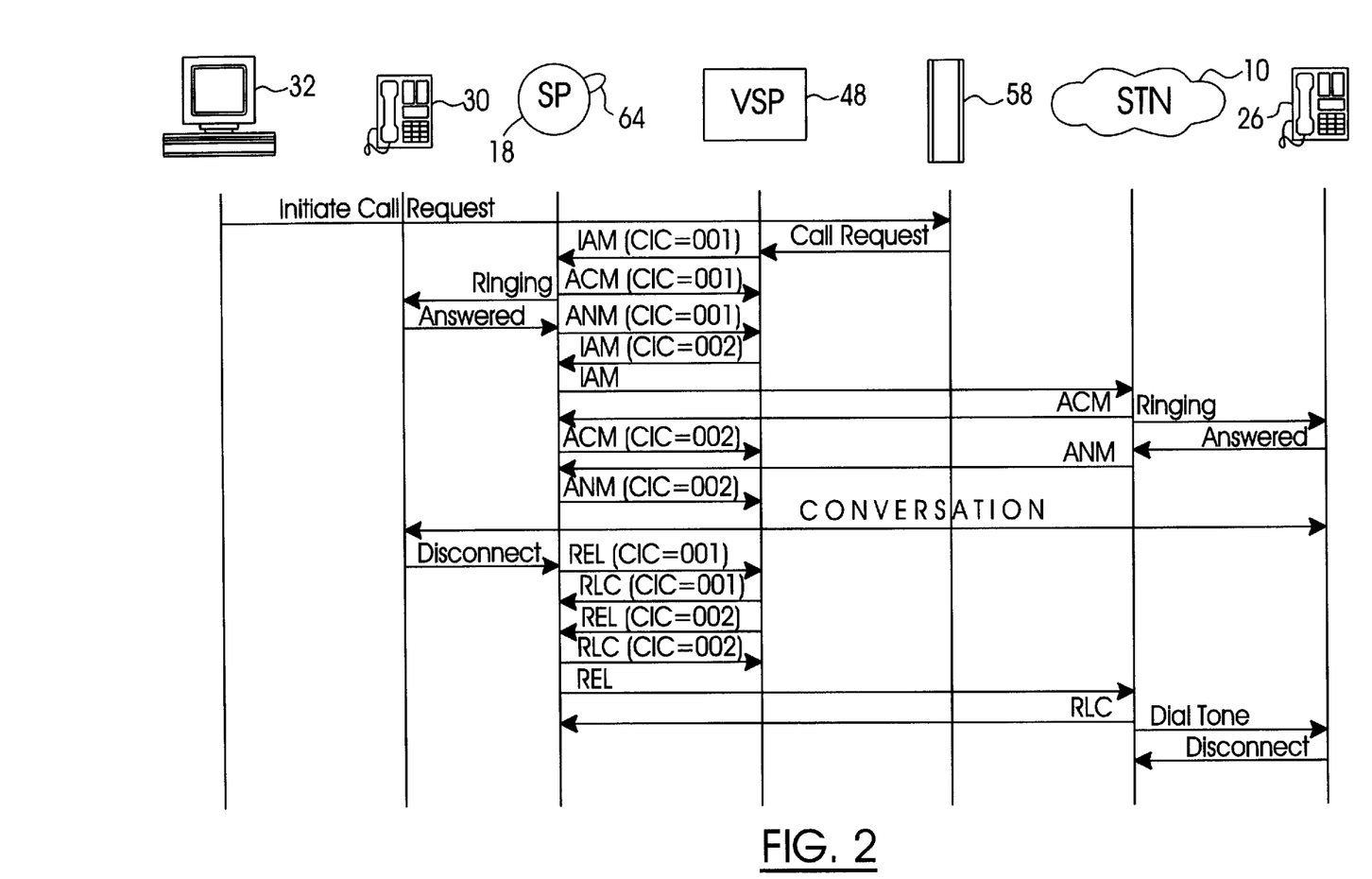
FIG. 2 is an exemplary call flow sequence showing principal actions in call setup and release in accordance with one embodiment of the system in accordance with the invention.

FIG. 2 illustrates a portion of the common channel signaling messages exchanged in a system in accordance with the invention during a basic call request initiated by a subscriber from the PC 32 to a subscriber telephone 26 connected to the STN 10. The common channel signaling system used in the North American STN today is Signaling System 7. Only principal components of the network involved in the call are shown in FIG. 2 for the purpose of clarity.

As shown in FIG. 2, a subscriber initiates a call request from his PC 32 by accessing the public server 58 through the Internet 34 (see FIG. 1) in a manner well known in the art. In this example, the subscriber requests that a call be originated from his telephone 30 and terminated at a subscriber telephone 26 connected to the STN 10. The subscriber telephone 26 is not within the local calling area of the subscriber telephone 30. On receiving the call request from subscriber PC 32, the public server 58 preferably verifies the call request to ensure that the calling and called numbers conform to a predefined format (in this instance the North American Dialing Plan) and formats a call request message addressed to an appropriate VSP in the network. The recipient VSP is preferably determined in a table look-up using the NNX-NXX of the calling number to locate the most appropriate VSP to initiate and control the call. In this example, the most appropriate VSP is the VSP 48. The public server 58 emits the call request message addressed to VSP 48 into the Internet. The call request message is received by VSP 48 and the VSP 48 responds by sending a first common channel signaling (CCS) message through the SS7 network of the STN 10 to the SP 18. In this example, the SP 18 is equipped with the loop-back trunk group 64 and the VSP 48 selects an idle member of that trunk group to serve the call request. In this example, a first end of the idle trunk member is designated by a Circuit Identification Code (CIC) of 001. On receipt of the IAM, the SP 18 seizes CIC 001 of the loop-back trunk 64 and checks the availability of the subscriber telephone 30. The subscriber telephone 30 is found to be available and the SP 18 returns an Address Complete Message (ACM) to the VSP 48 to acknowledge availability of the telephone 30. The SP 18 then applies ringing to the subscriber telephone 30 and the subscriber answers. On receipt of the answer signal, the SP 18 returns an Answer Message (ANM) to the VSP 48. VSP 48 is thereby informed that a first leg of the voice connection is complete. It therefore sends a second IAM to SP 18. The second IAM is assigned a CIC of 002 which causes SP 18 to seize the opposite end of the loop-back trunk member in trunk group 64 in order to complete a voice circuit on the loop-back trunk member. The SP 18 consults its translation tables and determines that it does not serve the called number in the IAM with the CIC of 002. It therefore reserves a trunk indicated by a link set in its translation tables and emits another IAM into the signaling network of the STN 10 which routes the call across the switched telephone network to a switching point which serves the subscriber telephone 26.

On receipt of the IAM at that SP (not illustrated) in the STN 10, the SP checks the availability of the subscriber telephone 26; on finding it available it returns an ACM to SP 18 via any other intervening switching nodes and applies ringing to the subscriber line for telephone 26. When the telephone 26 is answered, the SP in STN 10 returns an ANM message to SP 18, which in turn passes the ANM message back to the VSP 48 informing the VSP 48 that the second leg of the call is completed and conversation ensues between the subscriber telephone 30 and the subscriber telephone 26.

After conversation is complete, the subscriber telephone 30 hangs up which sends a disconnect signal to SP 18. SP 18 in response sends a Release message (REL) to VSP 48 informing the VSP 48 that the calling party has disconnected. VSP 48 responds with a Release Complete (RLC) indicating that its virtual end of CIC 001 has been released and SP 18 releases its seizure of the CIC 001 in loop-back trunk 64. On notice of the release of CIC 001, VSP 48 initiates a release of the second leg of the voice connection by sending a REL message with a CIC of 002 to SP 18 which in turn forwards the REL message through STN 10 to the SP which serves subscriber telephone 26. If the subscriber telephone 26 has not already gone on-hook, the SP which serves subscriber telephone 26 applies a dial tone to the subscriber's line. An RLC message is generated by the SP which serves subscriber telephone 26 on receipt of the REL message, a disconnect signal is received by the SP in the STN 10 and the SP returns an RLC message to SP 18 which in response returns an RLC with a CIC of 002 to the VSP 48 which permits the VSP 48 to free its resources and delete the table entries related to the call as explained in applicant's co-pending patent application. As will be explained below in greater detail, a call request need not be limited to a single called number as illustrated above. It will also be appreciated by those skilled in the art that other SS7 messages may be exchanged during call processing and that only those messages required to explain call flow in accordance with the invention are illustrated in FIG. 2.

Figure 3:
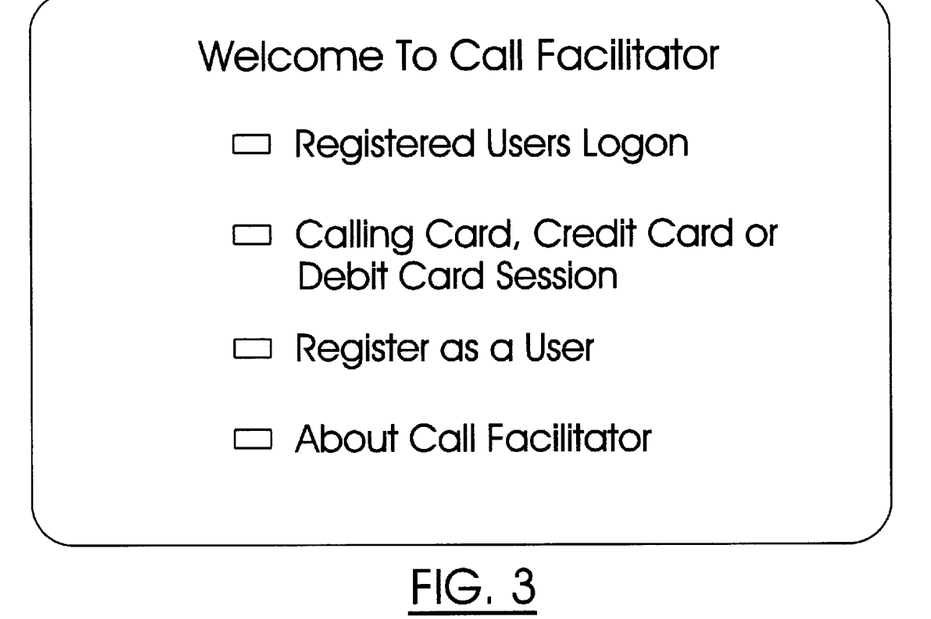
FIG. 3 is an exemplary format for a home page on a public server used to implement a system in accordance with the preferred embodiment of the invention.
Figure 4:
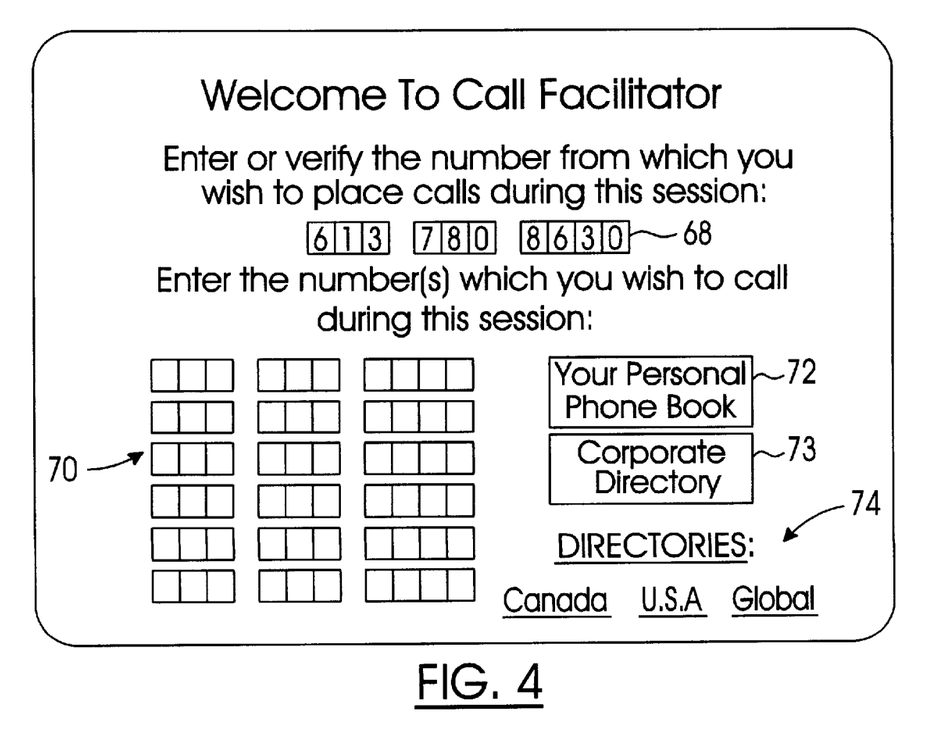
FIG. 4 is an exemplary format for a call request page on a public server used to initiate a call request using a system in accordance with the invention.

FIGS. 3 and 4 illustrate formats which may be used for two pages on the public server 58. FIG. 3 shows an exemplary home page for the public server 58. The home page permits registered users to logon and complete a call request; permits any user to establish a calling card, credit card or debit card session to initiate a call request; permits an individual to access a registration page for registering as a user; and, permits any party accessing the public server 58 to learn more about the function and utility of the system in accordance with the invention.

Since the system in accordance with the invention preferably permits users to initiate toll calls, provisions to accommodate billing must be considered if toll calling is enabled. Consequently, it is preferable that only registered users be permitted to place call requests. A user may be registered by completing a registration process as described below or temporarily registered by submitting valid calling card, credit card or debit card information to permit any toll calls initiated during a session to be billed to the card holder.

If the user wishes to register to use the system in accordance with the invention, they can do so by initiating a registration process which loads a registration page (not illustrated). The registration page preferably requests the user's full name and telephone number. When the public server 58 receives the individual's telephone number, a query is launched to determine whether the individual is a subscriber to the services of the STN service provider which operates the public server 58. If so, and the subscriber associated with the telephone number is determined to have an acceptable credit rating, a registration verification process is initiated. In that process, the public server 58 (see FIG. 1) formulates a verification call request message which is forwarded through the Internet 34 to a VSP which serves the individual, VSP 48, for example. On receipt of the registration call request, the VSP 48 initiates a first leg of a registration verification call to the subscriber as described above in relation to FIG. 2. When the first leg of the call is complete, the VSP 48 initiates a second leg of the call to the IVR 62. The function of the IVR 62 is to verify that a person attempting to register and supplying a telephone number as the billing number for calls is actually the subscriber associated with the billing number. On receipt of the registration verification call, the IVR 62 therefore plays a registration verification message in which the IVR 62 informs the calling party that they have requested registration as a user of the system and requests that they confirm their desire to be registered as a user by responding, for example, "YES" or "NO". An indication of the response received must be communicated back to the public server 58. This may be accomplished in any one of several ways. For example, if the IVR 62 is enabled to send TCP/IP messages, it may respond directly to the public server 58 with the indication. In that instance, when the IVR 62 receives the registered user response, it formulates an information message which it dispatches to the public server 58 indicating whether the called party acknowledged the desire to become a registered user. Alternatively, an indication of the response received may be passed back to the VSP 48 using common channel signaling messages. For example, a Release With Cause where the Cause parameter is used to indicate user acceptance or rejection of the registration may be used. For instance, on receipt of a "NO" response, indicating registration rejection, the IVR 62 could be programmed to terminate the call in a way that would cause the SP 14 to generate a REL with Cause. On receipt of a REL with Cause from the IVR 62, the VSP 48 examines the Cause parameter and formulates a TCP/IP message to the public server 58 indicating the user's acceptance or rejection of the registration.

If the user accepts registration, the public server 58 downloads a subpage which permits the user to enter a password. Typically, the password is verified by a duplicate entry in a manner well known in the art. This process substantially eliminates fraud while enabling essentially instant registration of parties wishing to utilize the features and functionality of the system in accordance with the invention. In order to coordinate IVR 62 response messages with registrations in progress, the IVR 62 is preferably programmed to accept calling line identification information from the SP 14 (FIG. 1), and to include the calling line identification data in the response message to the public server 58.

If an individual wishing to register as a user is determined not to be a subscriber of services provided by the service provider which operates the public server 58, a registration process similar to the one described above is followed except that the user may be requested to provide a credit card, calling card or debit card number to which calls can be billed. Alternatively, the user may be requested to enter a billing address to which services provided by the system may be billed. In either instance, a registration verification process is executed as described above wherein the number entered as the number of the individual requesting registration is called to verify that registration has been requested by that individual, in order to minimize fraud.

A user may temporarily register for a call session by supplying a valid calling card, credit card or debit card number in a manner well known in the art. If this option is selected, an initial page is downloaded requesting which type of card the user wishes to use for the session. The initial page preferably permits the user to select a card type with "radio-buttons" in a manner well known in the art. Once the card type is selected, an appropriate subpage permits the user to enter card information which generally consists of a card issuer, card number and Personal Identification Number (PIN) or, in the case of a credit card, an expiry date. On receipt of the card information, the public server 58 launches a query to an appropriate database to verify the validity of the card in a manner well known in the art. If the validity of the card is confirmed, the card information except for the PIN is stored for inclusion in a call request message forwarded to the VSP. As will be understood by those skilled in the art, calling card, credit card and debit card calls are typically handled by specially equipped switches configured to handle such billing in the network.

FIG. 4 shows an exemplary format for a call request page of the public server 58 in accordance with the invention. The page includes a modifiable area 68 for storing the number from which calls are to be originated. In the case of a registered user, the number will default to the telephone number of the registered user but it may be modified to permit the registered user to use the service while away from their regular telephone. An area 70 permits the entry of one or more telephone numbers to which calls are to be placed during a call session. The number of calls permitted is a matter of design choice. For credit card users, the number of calls per request is preferably limited to one as a fraud curtailment measure. It will be understood by those skilled in the art that users may be permitted to enter numbers which do not conform with the format of the North American Numbering Plan shown in FIG. 4. The number entry format may therefore be more flexible than the format illustrated. The user is preferably provided with options such as a personal telephone book 72 which stores names and telephone numbers of parties known to the registered user. The format, maintenance and features of a personal telephone book are matters of design choice and are well understood in the art. If the user is an employee of a corporation, a corporate directory 73 may also be made available to the user. A registered user is preferably also provided with access to telephone directories 74 for countries deemed to be of greatest interest. For example, access in the form of hyper-links may be provided to the Canada 411 directory of residential numbers, the United States 411 directory of residential numbers and/or a global directory to permit the user to search and retrieve numbers of individuals or companies to which calls are to be placed. Many other features may also be enabled and are matters of design choice.

Figure 5:
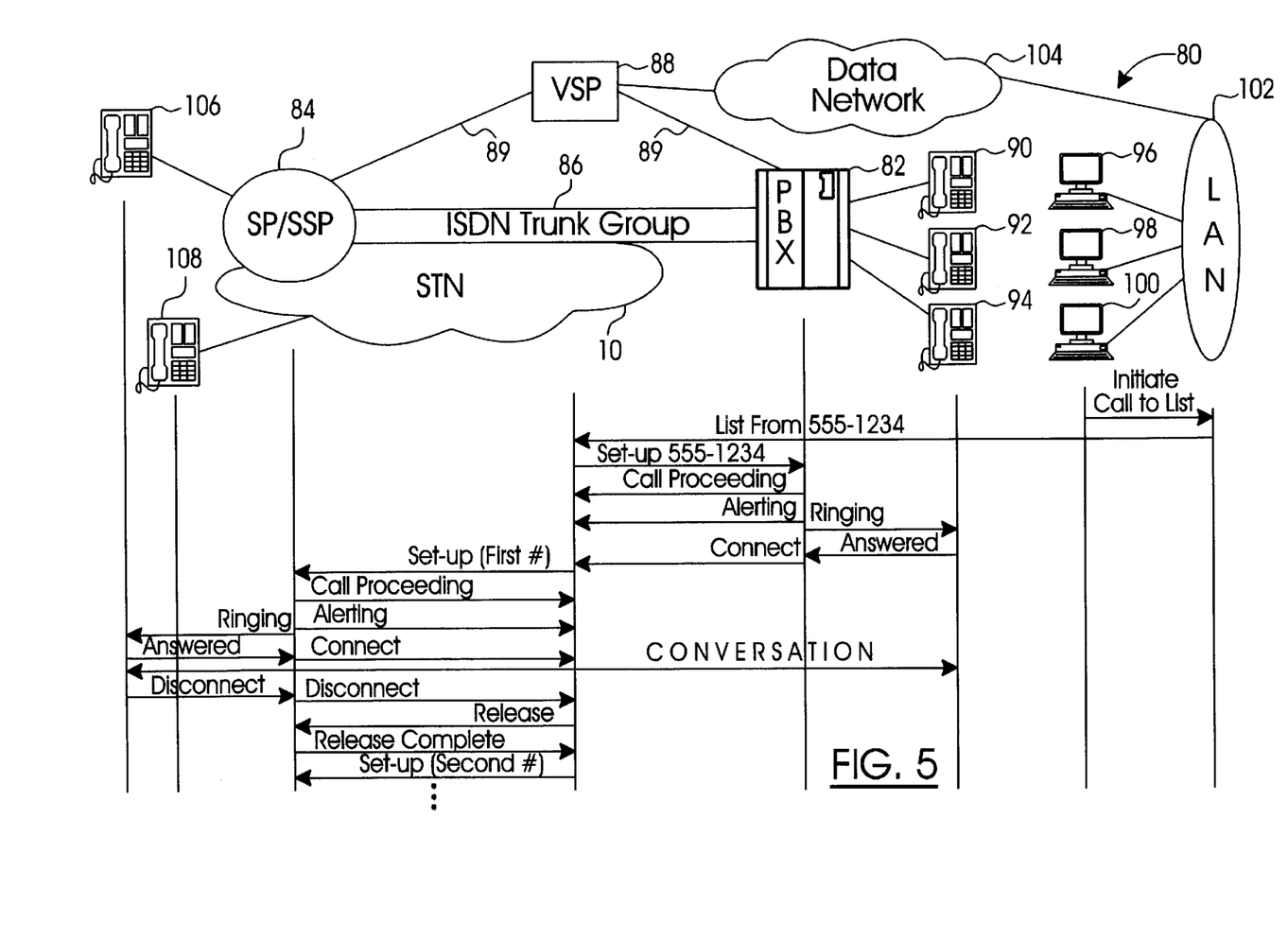
FIG. 5 is a schematic diagram of another embodiment of the invention, showing an exemplary call flow sequence using the embodiment.

FIG. 5 schematically illustrates a further embodiment of the invention in which a company, generally indicated by reference 80, operates a Public Branch Exchange (PBX) 82 connected to a Switching Point/Service Switching Point (SP/SSP) 84 by an ISDN trunk group 86 in a manner well known in the art. A VSP 88 in accordance with the invention is a physical node in the ISDN signaling network between the PBX 82 and the SP/SSP 84, which includes ISDN signaling links 89. The company 80 employs a plurality of individuals having telephones 90,92,94 and PCs or work stations 96,98,100. The PCs or work stations 96–100 are connected to a local area network (LAN) 102 which may in turn be connected to a data network 104 such as a Wide Area Network (WAN) or the Internet. The data network is in turn connected to the VSP 88. The LAN 102 may, however, be connected directly to the VSP 88 and need not be routed through the data network 104. The SP/SSP 84 is a switching node in the STN 10. A subscriber telephone 106 is served by SP/SSP 84 and another subscriber telephone 108 is served by a switching node in the STN 10.

FIG. 5 also shows an exemplary call sequence in which an employee of the company 80 initiates a call session using work station 100. The call session is initiated by, for example, completing a call request form similar to that shown in FIG. 4. It is assumed for example that the employee wishes to place several sequential calls to customers. The employee therefore completes a call request and initiates the call by sending the request list via the LAN 102 to the VSP 88. On receipt of the call request list, the VSP 88 initiates a first leg of the voice connection by sending an ISDN message over signal line 89 to the PBX 82. The PBX receives the message and verifies that telephone 94 is available, returns a call proceeding message to the VSP 88 followed by an alerting message indicating that it has applied ringing to the line of telephone 94. When the telephone is answered, PBX 82 sends a connect message to the VSP 88 to inform the VSP 88 that the first leg of the call connection is established. VSP 88 then sends an ISDN message over signal line 89 to SP/SSP 84 requesting that it set-up the first telephone number specified in the list by the user of PC 100. In this case, the first call is to telephone 106 served by the SP/SSP 84. The SP/SSP 84 checks the availability of telephone 106 and on finding it available informs the VSP 88 using a call proceeding message that the telephone 106 is available. The SP/SSP 84 then advises the VSP 88 that it is alerting the telephone 106 and it applies ringing signals to the line of the telephone 106. When the telephone 106 is answered, the SP/SSP 84 sends a connect message back to VSP 88 and conversation ensues between the two parties.

After the conversation is complete, the user at telephone 106, for example, places the telephone 106 on-hook which sends a disconnect signal to the SP/SSP 84. A disconnect message is forwarded to the VSP 88 which returns a release message to the SP/SSP 84. It should be noted that the disconnect message is not passed on by VSP 88 to the PBX 82. Instead, the VSP 88 blocks the disconnect and release complete messages received from SP/SSP 84 and returns a second call set-up message using the second number from the list provided by the user at PC 100. As will be understood by those skilled in the art, the call connection between telephone 94, the PBX 82 and the SP/SSP 84 is still up on one channel of the ISDN trunk group 86 used for the first call. Therefore, when the VSP 88 sends a set-up message containing the second number from the call list, it specifies that trunk member of the ISDN trunk group 86 as the circuit to be used for the call. The second call is placed, for example, to the subscriber telephone 108 connected to the STN. The SP/SSP therefore forwards an IAM (not illustrated) through the STN 10 to an SP (not illustrated) which serves telephone 108 and a voice connection sequence similar to that described above with reference to FIG. 2 is followed until a voice connection is established between telephone 94 and telephone 108. As will be understood by those skilled in the art, the ringing tones applied at telephone 108 are passed back over the voice connection and audible to the user at telephone 94.

Preferably, the VSP 88 is programmed to time-out after a predefined period of time if a connect message is not received back from SP/SSP 84 to indicate that the call has been answered. This permits an attempt to connect to a next number in the list if the current attempt is unsuccessful because the line is busy, the telephone is unanswered or at the caller's discretion. If a time-out condition is encountered by the VSP 88, the VSP 88 examines the call list to determine whether an attempt has been made to establish the second leg of the voice connection with each number on the list. If each call has been attempted, the VSP is preferably enabled to retry any unsuccessful call attempts. This may be an automatic retry or VSP 88 may send a message to the PC 100 requesting whether the user wishes to retry those calls which were not successfully completed.

The VSP is also preferably enabled with full CTI functionality so that the call originating party is kept fully informed of call progress and in constant control of the call connections through call progress display messages and call control options. Table 1 shows a sample call flow sequence with the call progress messages and call control options displayed on the calling party's PC during a call session:

TABLE 1

| Call Process | Progress Message | Control Options |
| --- | --- | --- |
| Send IAM | Calling 613-123-4567 | • Cancel Session<br>• Cancel Call<br>• Add Number to List<br>• Call _ _ _-_ _ _-_ _ _ _ Immediately |
| Receive ACM | 613-123-4567 - ringing | • Cancel Session<br>• Cancel Call<br>• Add Number to List<br>• Call _ _ _-_ _ _-_ _ _ _ Immediately |
| Receive ANM | 613-123-4567 - answered | • Cancel Session<br>• Add Number to List<br>• Hang Up and Call Next<br>• Hang Up and Call<br>_ _ _-_ _ _-_ _ _ _ Immediately |
| Receive REL | 613-123-4567 - disconnected, Next Call 514-765-4321 | • Cancel Session<br>• Add Number to List<br>• Skip Next Call<br>• Call _ _ _-_ _ _-_ _ _ _ Immediately |

While it will be understood that the sequence shown in Table 1 uses the ISUP signalling sequence, an ISDN signalling sequence is very similar and the Call Progress and Control Options are the same. It should also be understood that the Progress Messages and Control Options shown in Table 1 are exemplary only. Other Control Options may be implemented to permit the calling party to control the calling session. It will be understood that the call sequence shown in Table 1 only illustrates an instance in which the called party is available and answers the call. There will be instances where the called line is busy or unanswered and the Call Progress and Control Options will change accordingly.

Figure 6A:
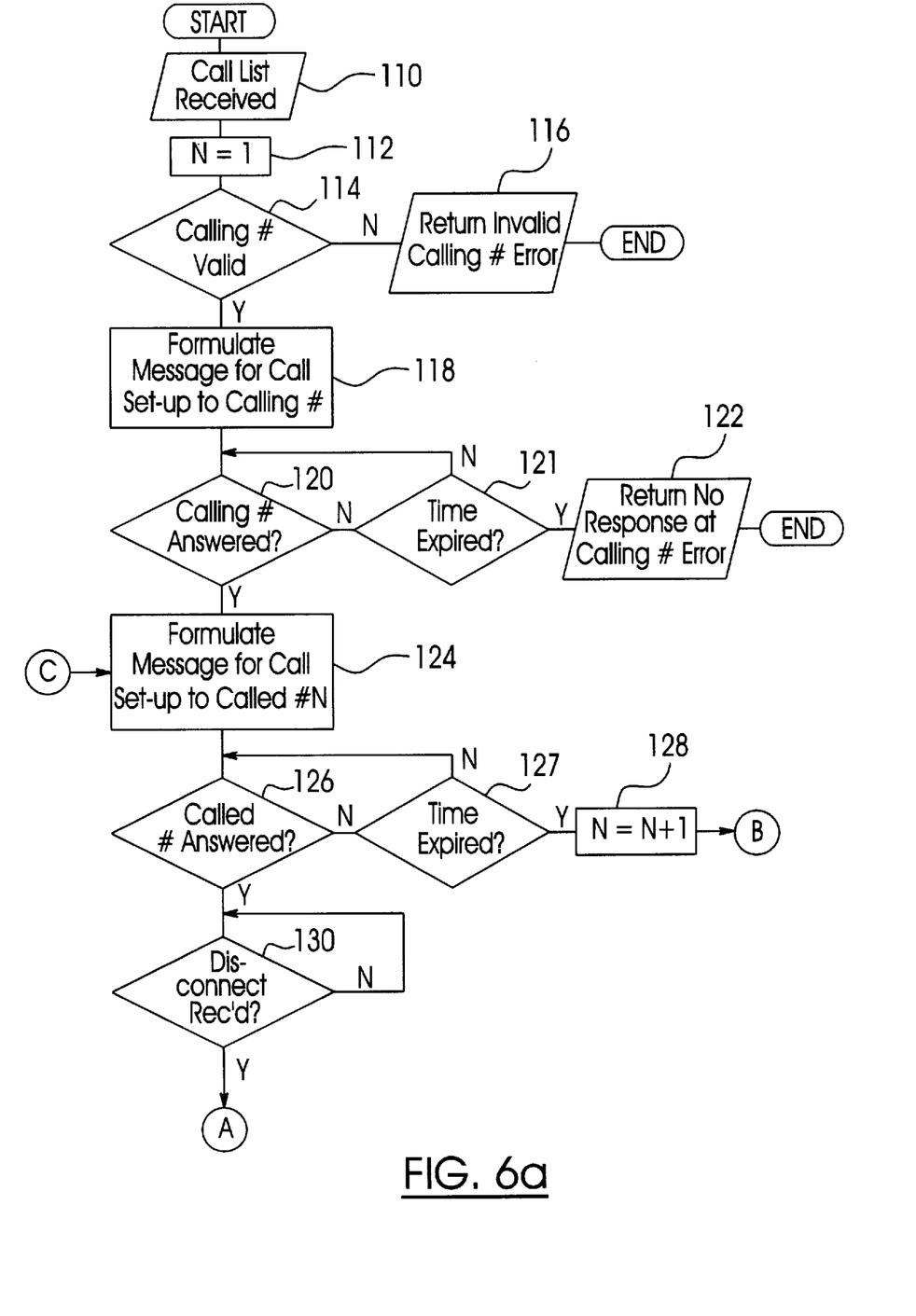
FIGS. 6a and 6b are a flow chart illustrating the principal steps in a call process in accordance with the preferred embodiments of the method in accordance with the invention.
Figure 6B:
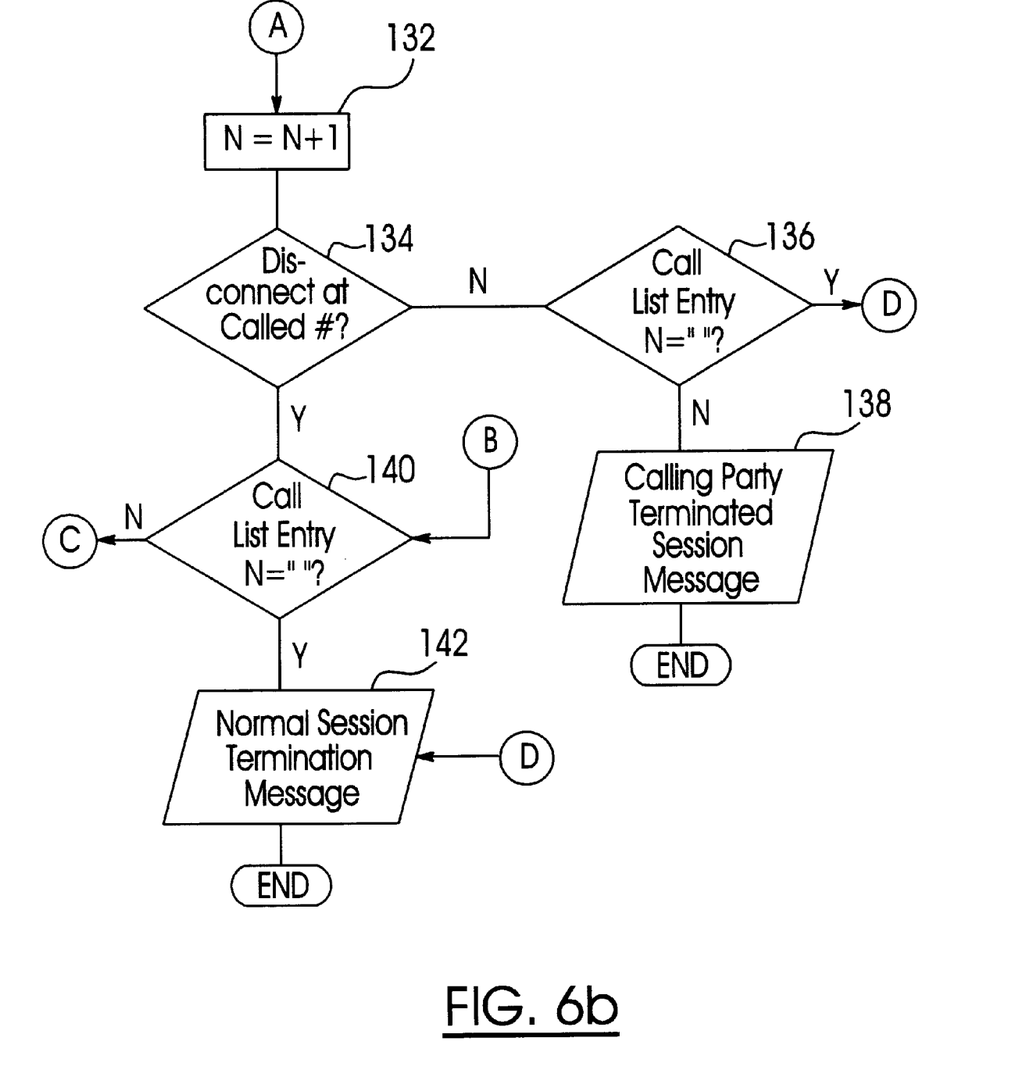

FIGS. 6a and 6b are a simplified flow chart of the principal logic executed by the VSP 46,48,88 on receipt of a call request list. In step 110, a call request list is received from the public server 58 or the business 80, for example. On receipt of the call request list in step 110 a counter N is initialized to 1 in step 112. The counter N is used as an index for examining a called number table passed in the call list request message. In step 114, the calling number passed in the call list request message is examined to determine whether it conforms to an accepted format such as the NANP. If not, an invalid calling number error is returned to the source of the call request message and processing is terminated. If the calling number passes the calling number validation screen in step 114, a CCS message for call setup to the calling number is performed at step 118 as described above with reference to FIGS. 2 and 5. The receipt of an ANM message, or its equivalent is checked at regular intervals. If the message is not received, indicating that the calling number has not answered, a timer is checked in step 121 to determine whether a predetermined time has elapsed since the dispatch of the CCS message for call set-up to the calling number. If the predetermined time has not elapsed, the periodic check for receipt of the ANM message is continued. If the time has elapsed, a "no response from the calling number" error is returned in step 122 to the source of the call request message received in step 110. If an ANM message is received indicating that the calling number has answered, the VSP 46,48,88 formats a CCS message for call setup to the called number N in the called number table in step 124. Periodic checks are made in step 126 to determine whether the called number has answered and if not the time elapsed register is examined to determine whether the elapsed time has exceeded a predetermined time allowed for an answer. If the predetermined time is determined in step 127 to have elapsed, the counter N is incremented by 1 and the program branches to branch B as will be explained below with reference to FIG. 5a. If the called number has answered, the VSP 46,48,88 monitors the common channel signaling links for a disconnect signal received from either end in step 130. Monitoring continues at periodic intervals until a disconnect signal is received.

On receipt of the disconnect signal, the counter N is incremented by 1 in step 132. In step 134, the VSP 46,48,88 determines whether the disconnect was received from the originating or the terminating end of the call. If the disconnect is received from the originating (calling party) end of the voice connection, the call list entry at N is examined in step 136 to determine whether all calls on the list have been attempted. If so, the VSP 46,48,88 preferably returns a normal session termination message to the source of the call request in step 142. Otherwise, the VSP 46,48,88 preferably returns a message indicating that the calling party terminated the session in step 138. A screen display may request the calling party to indicate whether they wish to terminate or resume the session, the logic for which is not described here but will be apparent to a person of ordinary skill in the art. If in step 134 it is determined that the disconnect originated at the called number end of the voice connection, the call list entry number N is examined to determine whether the list includes another number to be called. If the entry N is not empty, the program branches back to step 124 and another CCS message is formulated to set up the called number without releasing the called party as described above with reference to FIGS. 2 and 5. If the call entry at the call list occurrence N is blank, a normal session termination message is returned to the source of the call request message in step 142 and processing is terminated. The normal session termination message preferably simply advises the calling party that all call attempts have been completed. If certain called numbers were not answered, the session termination message may request whether the calling party wishes attempts to be made to connect to those voice terminals where no response was received. The logic for those routines is likewise not illustrated but will be apparent to persons of ordinary skill in the art.

For clarity, the logic shown in FIGS. 6a, 6b does not include the steps of receiving Control Option messages from the calling party. It will be understood that the Control Options may change call flow at any time and the number of possible permutations, although within the scope of understanding of a person skilled in the art, are not readily illustrated.

The invention provides a flexible method of completing calls using the advantages of computer telephony integration without the inherent disadvantages of prior art methods for completing such calls. All calls are completed using the switched telephone network to ensure quality transmission. Due to the architecture of the system in accordance with the invention, calls are efficiently completed without redundant circuits. Furthermore, a plurality of calls can be placed in sequence without the time consuming disconnection of the calling party, or any other inconvenience and the calling party is in constant control of the call sequence.

Changes and modifications to the embodiments described above will no doubt become apparent to those skilled in the art. The scope of the invention is therefore intended to be limited solely by the scope of the appended claims.

We claim:

1. A method of completing a voice connection between a first and second voice terminal in a Switched Telephone Network (STN), comprising the steps of:

receiving a call request at a Virtual Switching Point (VSP) in the STN having a connection to a data network;

initiating a first Common Channel Signaling (CCS) ISDN User Part (ISUP) message session from the VSP over a signaling network of the STN to a switching point in the STN to establish a first leg of the voice connection; and initiating a second ISUP message session from the VSP to a switching point in the STN to establish a second leg of the voice connection;

the first and second ISUP message sessions being interrelated to an extent that messages originating from the VSP include a circuit identification code associated with opposite ends of an ISUP voice trunk in the STN.

2. A method of completing a voice connection between a first and second voice terminal as claimed in claim 1 wherein the first and second CCS message sessions are with the same switching point and the ISUP voice trunk is a loop-back trunk having first and second ends which terminate on the switching point (SP).

3. A method of completing a voice connection between a first and second voice terminal as claimed in claim 1 wherein the first and second CCS message sessions are with different switching points (SPs) and the ISUP voice trunk is an inter-switch trunk having first and second ends which respectively terminate on the different switching points (SPs) in the STN.

4. A method of completing a voice connection between a first and second voice terminal as claimed in claim 1 wherein the CCS message is a Signaling System 7 (SS7) ISDN User Part (ISUP) message.

5. A method of completing a voice connection between a first and second voice terminal as claimed in claim 4 wherein the ISUP message is an Initial Address Message (IAM).

6. A method of completing a voice connection between a first and second voice terminal as claimed in claim 1 wherein the data network is the Internet.

7. A method of completing a voice connection between a first and second voice terminal as claimed in claim 6 wherein the call request is received from a World Wide Web server on the Internet.

8. A method of completing a voice connection between a first and second voice terminal as claimed in claim 1 wherein the call request message comprises a list of at least one telephone number to which sequential voice connections are to be established.

9. A method of completing a voice connection between a first and second voice terminal as claimed in claim 8 wherein the first leg of the voice connection is maintained until an attempt has been made to establish the second leg of the voice connection for each of the at least one telephone number, unless the first voice terminal terminates the first leg of the voice connection before all attempts have been completed.

10. A method of completing a voice connection between a first and second voice terminal as claimed in claim 1 wherein the first CCS message session is with a switching point (SP) in a local calling area associated with the first leg of the voice connection.

11. A method of completing a voice connection between a first and second voice terminal as claimed in claim 1 wherein the voice connection is a toll call and charges for the toll call are billed to a calling card, a credit card, or a debit card.

12. A method of completing a voice connection between a first and second voice terminal as claimed in claim 11 wherein the first and second CCS message sessions are both with a switching point (SP) designated for calling card, credit card and debit card billing and the ISUP voice trunk is a loop-back trunk group having first and second ends that terminate on the switching point (SP).

13. A method of completing a voice connection between a first and second voice terminal as claimed in claim 1 wherein the ISUP voice trunk is an ISDN trunk and the first CCS message is a ISUP message session is over an ISDN link to a Private Branch Exchange (PBX), the second CCS message session being with a switching point (SP) in the switched telephone network (STN) on which the ISDN trunk terminates.

14. A method of completing a voice connection between a first and second voice terminal as claimed in claim 13 wherein the call request comprises a list of telephone numbers to be called and the first leg of the voice connection is maintained until at least one attempt has been made to complete a second leg of the voice connection with each of the respective telephone numbers to be called.

15. A method of completing a voice connection between a first and second voice terminal as claimed in claim 1 wherein the call requests originate from a calling party having a data terminal connected to a data network, and the VSP returns call progress messages through the data network to the data terminal to provide the calling party with call progress information.

16. A method of completing a voice connection between a first and second voice terminal as claimed in claim 15 wherein the calling party may communicate call control options to the VSP at any time in order to control a call session.

17. A method of completing a voice connection between a first and second voice terminal as claimed in claim 16 wherein the call control options include: cancel session; cancel call; add a new called number to a call list; cancel call and call a new specified number; and skip next call in the call list.

18. A method of completing a voice connection between a first and second voice terminal as claimed in claim 16 wherein the call control options change depending on the stage of a call in progress.

19. A system for completing a voice connection between first and second voice terminals connected to a switched telephone network (STN), comprising:

a virtual switching point (VSP) which is a physical node in a signaling network and a virtual node in a transmission network of the STN, the VSP being connected by a signaling link to a signal transfer point of the signaling network and including:

a signaling link with a data network for receiving a call request via the data network from a calling party having the first voice terminal, the call request including a telephone number for the first voice terminal and a telephone number for at least the second voice terminal;

means for generating a first common channel signaling (CCS) ISDN User Part (ISUP) signaling message to initiate a voice connection with the first voice terminal and a second ISDN User Part (ISUP) signaling message to initiate a voice connection with the second voice terminal, the first and second ISUP messages being related to an extent that a circuit identification code of each ISUP message is respectively associated with opposite ends of an ISUP voice trunk.

20. A system for completing a voice connection between first and second voice terminals as claimed in claim 19 wherein the ISUP voice trunk is a loop-back trunk on a switching point in the switched telephone network (STN).

21. A system for completing a voice connection between first and second voice terminals as claimed in claim 19 wherein the voice facility is an ISUP trunk between two Switching Points (SPs) in the switched telephone network (STN).

22. A system for completing a voice connection between first and second voice terminals as claimed in claim 19 wherein the signaling link with the data network is a link which supports data messages in TCP/IP format.

23. A system for completing a voice connection between first and second voice terminals as claimed in claim 19 wherein the system further includes a public server which may be accessed by users, the public server being adapted to permit the users to generate the call requests.

24. A system for completing a voice connection between first and second voice terminals as claimed in claim 23 wherein the STN includes a plurality of VSPs strategically located in the network, each local calling area in the switched telephone network (STN) including at least one VSP.

25. A system for completing a voice connection between first and second voice terminals as claimed in claim 24 wherein the public server includes a table for selecting an appropriate VSP to serve a call request, the table associating a VSP with at least a portion of a telephone number for the first voice terminal.

26. A system for completing a voice connection between first and second voice terminals as claimed in claim 23 wherein the system further includes an Interactive Voice Response (IVR) unit used to confirm the registration of users registering to use call connection services of the system.

27. A system for completing a voice connection between first and second voice terminals as claimed in claim 23 wherein the system permits calls to be billed to a calling card, credit card or debit card.

28. A system for completing a voice connection between first and second voice terminals as claimed in claim 27 wherein calls billed to a calling card, credit card or debit card are routed to a switching point in the switched telephone network (STN) dedicated to handling such calls.

29. A system for completing a voice connection between first and second voice terminals connected to a switched telephone network (STN) as claimed in claim 19 wherein the VSP responds at any time to call control option messages received from the calling party via the data network after a call session is in progress.

30. A system for completing a voice connection between first and second voice terminals connected to a switched telephone network (STN) as claimed in claim 29 wherein the call control option messages may instruct the VSP to: cancel calling session; cancel a current call; add a new number to a call request list; skip next number in the call request list; and cancel current call and dial a specified number.

31. A system for completing a voice connection between first and second voice terminals connected to a switched telephone network (STN) as claimed in claim 30 wherein the call control options are displayed for the calling party on the data terminal.

32. A system for completing a voice connection between first and second voice terminals connected to a switched telephone network (STN) as claimed in claim 30 wherein the call control options displayed for the calling party are changed in response to changes in call progress.

* * * * *